United States Patent

[11] 3,599,866

| [72] | Inventor | Jack C. Bolton |
| | | Salinas, Calif. |
| [21] | Appl. No. | 754,436 |
| [22] | Filed | Aug. 21, 1968 |
| [45] | Patented | Aug. 17, 1971 |
| [73] | Assignee | Soilserv, Inc. |
| | | Salinas, Calif. |

[54] ATOMIZING SPRAY PROCESS AND APPARATUS
5 Claims, 4 Drawing Figs.

[52] U.S. Cl............................................... 239/8,
47/1.7, 239/127, 239/163, 239/311, 239/417.3,
239/551
[51] Int. Cl....................................................... A01n 17/02
[50] Field of Search........................................... 239/8, 11,
127, 163, 164, 550, 551, 548, 566, 599; 47/1.7

[56] References Cited
UNITED STATES PATENTS

| 2,475,676 | 7/1949 | Ralph | 239/180 X |
| 3,023,970 | 3/1962 | Knoell | 239/550 X |
| 3,062,454 | 11/1962 | Cocks | 239/550 X |
| 3,421,695 | 1/1969 | Phelps et al. | 239/164 |
| 2,976,647 | 3/1961 | Pickrell | 47/1.7 X |
| 3,191,871 | 6/1965 | Palmer | 239/599 X |

*Primary Examiner*—M. Henson Wood, Jr.
*Assistant Examiner*—Michael Y. Mar
*Attorney*—Townsend and Townsend ABSTRACT: An apparatus and process for spraying crops with atomized liquid spray. A supported nozzle system is passed over a crop. The nozzle system is supplied with liquid spray preparation and atomizing air at high pressures and is oriented to discharge atomized spray downwardly. The high-pressure atomizing air produces a turbulent cloud which displaces the ambient atmosphere adjacent the sprayed crop, effects dilution of the spray preparation without diminishing spray effectiveness, and penetrates the foliage undersides to coat the entire plant with spray.

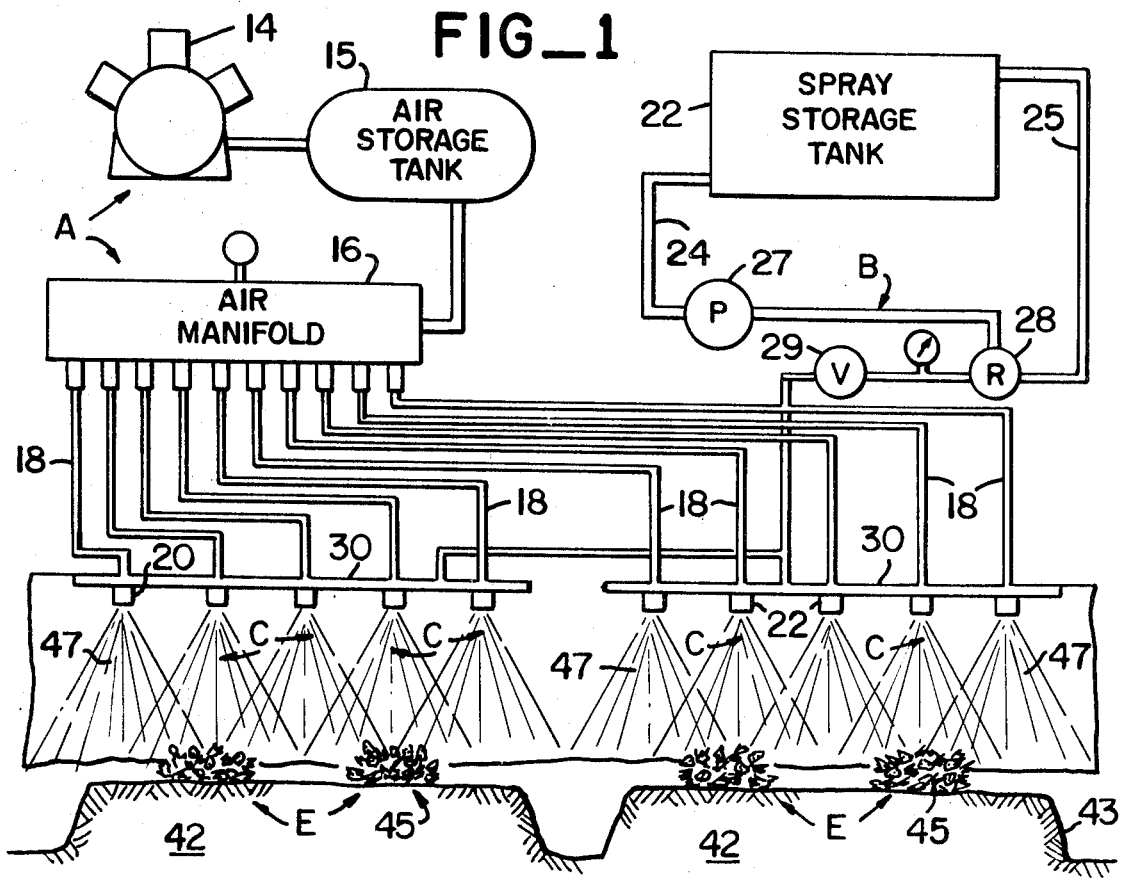
FIG_1
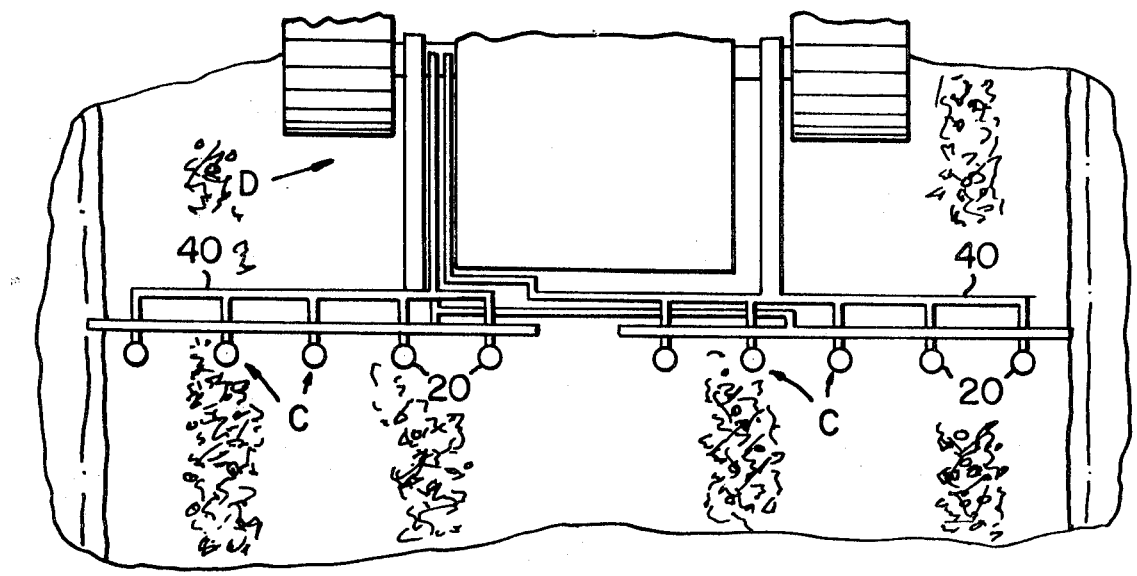
FIG_2
INVENTOR.
JACK C. BOLTON
BY
Townsend and Townsend
ATTORNEYS

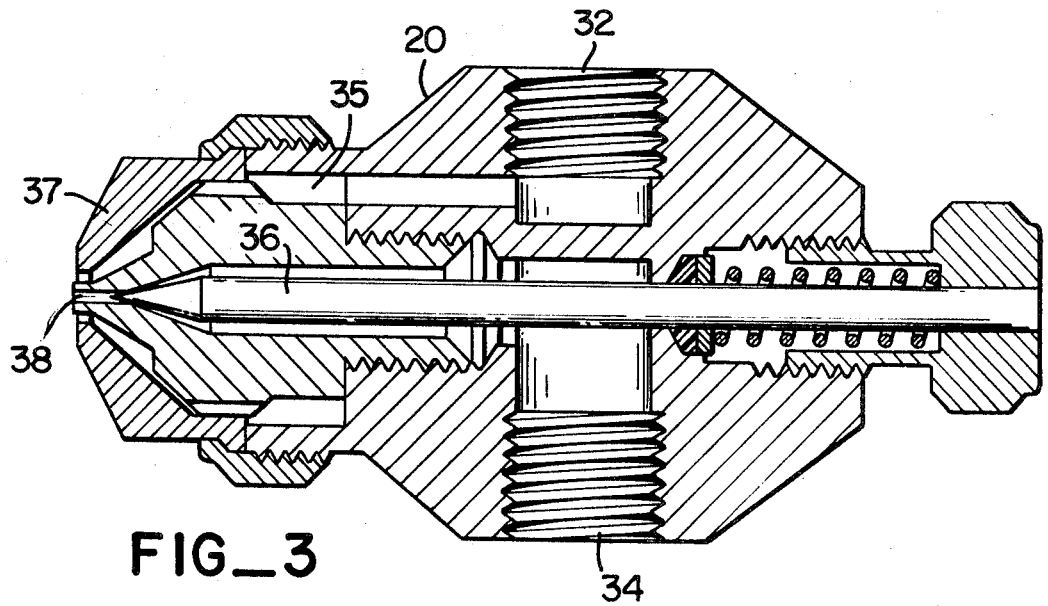
FIG_3
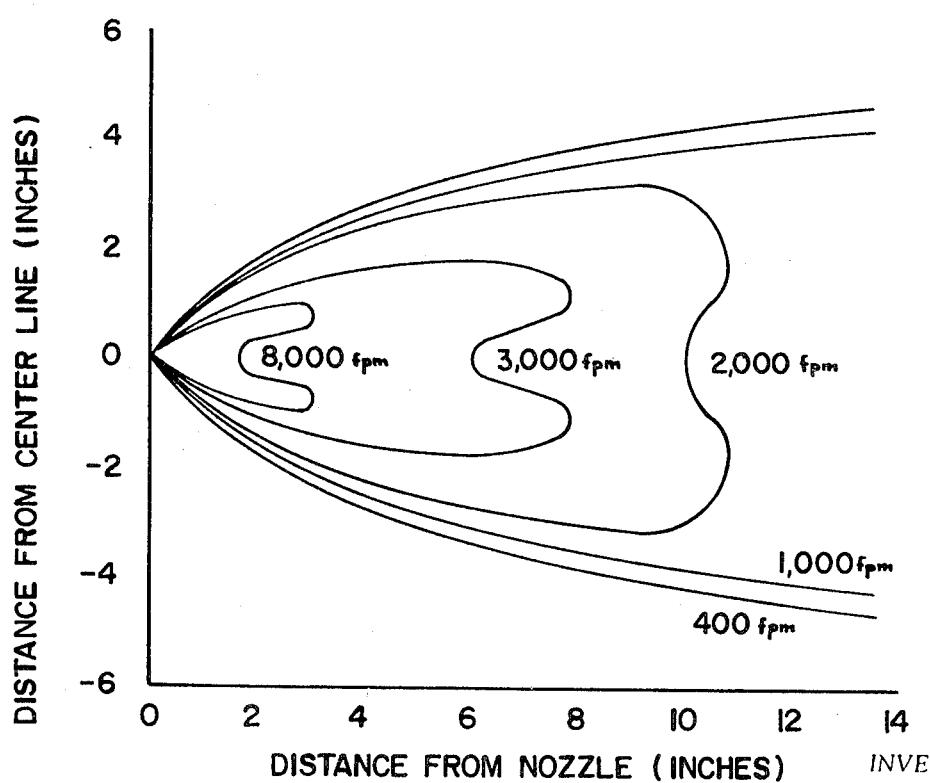
FIG_4
INVENTOR.
JACK C. BOLTON
BY
Townsend and Townsend
ATTORNEYS

ATOMIZING SPRAY PROCESS AND APPARATUS

This invention relates to the spraying of crops and sets forth a method and apparatus of crop spraying wherein high-pressure air is used to atomize spray preparation and envelopes a crop in a turbulent downwardly directed cloud of spray for the application of the spray throughout the crop foliage.

Spraying apparatus utilized for treating crops with dense foliage such as lettuce, strawberries, broccoli and the like must apply a uniform layer or coating of spray throughout the treated vegetation. Heretofore sprayers have been relatively ineffective in penetrating the underside of the treated foliage and further have not been able to effuse the spray in obstructed foliage locations interior of the treated plant.

A further difficulty of conventional sprayers is that the potent and concentrated mixtures of insecticides and fungicides must be distributed in large volumes of diluents, such as water. It has been found that these diluents, while accomplishing necessary dispersion of the potent and concentrated spray mixtures, diminish the spray effectiveness. Furthermore, in spray operations utilizing such diluents, large volumes of the diluents must be transported to and moved with the spray apparatus increasing the costs of applying the spray.

The present invention discloses a tractor supported spray system providing improved foliage penetration and agricultural chemical dilution. Typically, the supported atomizing nozzle system is passed over the planted crop at an elevation less than 10 inches above the topmost foliage. The atomizing nozzle system, oriented to discharge atomized spray substantially downwardly, is supplied with liquid spray preparation and high-pressure air of at least 40 pounds per square inch above atmospheric pressure. The nozzle system as supplied with the high-pressure air emanates a downwardly directed turbulent cloud having velocities therein of at least 1,000 feet per minute permeating the plant foliage throughout with a spray coating.

A primary object of this invention is to coat the undersides and obstructed foliage surfaces of the treated crop with atomized spray. In the present invention this is achieved by effusing downwardly a turbulent cloud of spray swirling in random directions which turbulent cloud penetrates and coats the foliage undersides and obstructed surfaces with spray.

An advantage of this invention is that the effused downwardly directed turbulent cloud displaces the ambient atmosphere surrounding the crop. This displacement of the ambient atmosphere completely envelopes the crop in a turbulent cloud of atomized spray and prevents the ambient atmosphere from diluting or resisting the spray treatment.

A further advantage of this invention is that the downwardly directed turbulent cloud has localized wind velocities therein sufficient to effect a turbulent displacement of the crop foliage. This displacement temporarily moves the crop foliage without damage and exposes substantially all of the foliage surfaces to the desired treatment.

An additional object of this invention is to provide for homogeneous dilution of concentrated fungicides and insecticides. To this end, spray preparation having relatively high concentrations of fungicides and insecticides are atomized in substantially large volumes of air. This air molecularly disperses the spray preparation uniformly throughout the treated foliage.

An advantage of this invention is that liquid spray preparation having relatively high concentrations of insecticides and fungicides can be sprayed over a crop without substantial contamination or foliage burns.

A further advantage of the air of the spray preparation is that the air effects a dispersion of the spray without diminishing its insecticide or fungicide effectiveness.

Other objects, features and advantages of the present invention will be more apparent after referring to the following specification and attached drawings in which:

FIG. 1 is a schematic of a tractor mounted spray system illustrating in elevational view the orientation of the nozzle system with respect to a sprayed crop;

FIG. 2 is a plan view showing the rearward portion of a tractor having the nozzle system of the disclosed spray apparatus mounted thereto;

FIG. 3 is a side elevational section of an atomizing spray nozzle suitable for use in the present invention; and FIG. 4 is a graphic representation of the velocities within an effused cloud of spray emanating from the nozzle of FIG. 3.

Referring to FIGS. 1 and 2, the present invention is schematically illustrated. An air system A and spray system B are both connected to nozzle system C. Typically, air system A, spray system B, and nozzle system C are all mounted on a tractor D for transport across a planted crop E.

In operation, air system A and spray system B supply air and liquid spray preparation respectively to nozzle system C where carburetion or atomization occurs. Nozzle system C, oriented to effuse downwardly a turbulent cloud of atomized and swirling spray, envelopes planted crop E as tractor D traverses the planted area, coating the crop vegetation with spray.

Air system A comprises a compressor 14 connected to an air manifold 16 through a storage tank 15. Manifold 16 has outlets corresponding to each of the spray nozzles 20 utilized within nozzle system C. These outlets are connected to nozzles 20 typically by nozzle hoses 18.

Spray system B includes a spray storage tank 22, a spray preparation pump 27 and a regulator 28. In operation, pump 27 draws liquid spray preparation from tank 22 through outlet piping 24. The spray preparation is impelled through the pump to regulator 28. At regulator 28, fluid is supplied under constant pressure to spray nozzles 20 through shutoff valve 29, manifolds 30 and connected piping. The spray preparation not supplied to nozzles 20 is bypassed at regulator 28 and returned or recirculated to tank 22 through tank inlet pipe 25.

Referring to FIG. 3, a spray nozzle 20 is illustrated suitable for use with the present invention. Nozzle 20 includes an air inlet 32, a spray preparation inlet 34, and is designed internally to effect efficient atomization or carburetion of the inflowing liquid spray preparation and air. Typically, air flows interior of the nozzle from air inlet 32 along air passage 35 to air-deflecting nozzle 37. Spray preparation flows from spray inlet 34 along needle valve 36 through atomizing aperture 38.

In operation of the nozzle system, spray preparation supplied under pressure to inlet 34 is discharged from atomizing aperture 38 under pressure. The aperture, in combination with needle valve 36 effects a slight mechanical dispersion of the liquid spray preparation forced therethrough. Upon being discharged from atomizing apertures 38, the mechanically dispersed spray is intercepted by cross streams of high-velocity air from air-deflecting nozzle 37. The emanating air further disperses the spray preparation and entraps and entrains this preparation emitting it from nozzle 20 in the form of a high-velocity cloud.

It should be noted that the illustrated invention can be used with a variety of atomizing nozzles. The particular nozzle illustrated is the product of Binks Manufacturing Company and is identified by the Model No. 50-110-R15.

Spray system B commonly emits liquid spray preparation to spray preparation inlet 34 of nozzle 20 at a pressure of 20 pounds per square inch. Air system A supplies high-pressure air to air inlet 32 at pressures exceeding 40 pounds per square inch, the preferred air pressure being 80 pounds per square inch.

Dependent upon the particular configuration of the atomizing nozzle utilized with the present invention the upper range of air pressure may be varied. Generally, however, the air pressure should be maintained below a limit where the effused turbulent cloud will not have a velocity which can destroy or injure the crop foliage. Such an air pressure may be easily determined by those skilled in the art.

Nozzles 20 are typically supported in side-by-side relation to nozzle mounting brackets 40 carried on tractor D. Brackets 40 are in turn adjusted to support nozzles 20 at a distance in the range between 2 inches and 10 inches above the topmost foliage of the crop E being sprayed, the preferred elevation being 4 inches to 6 inches.

Nozzles 20 as supported by brackets 40 are mounted so as to discharge and spray substantially downward. These nozzles are oriented so that the effused cloud of atomized spray has its mass impelled downward within 45° of vertical.

The atomizing air as supplied to nozzles 20 produces a turbulent cloud. This cloud contains therein rapidly moving atomized particles of liquid spray preparation as illustrated by the graph of FIG. 4.

With reference to FIG. 4, the velocity profile of spray emitting from the described Binks nozzle No. 50-110-R15 is illustrated. Liquid spray preparation was supplied to a single nozzle at 20 pounds per square inch and air was supplied to the nozzle at 80 pounds per square inch. Velocity measurements were taken with a Kiel probe at preselected intervals from the nozzle discharge. The Kiel probe determines velocity without reference to the particular direction from which the velocity emits. Lines of constant velocity are illustrated on the graph with respect to the distance from the nozzle output, it being particularly noted that the main body of effused spray at a distance of 10 inches from the nozzle is traveling at a velocity in excess of 2,000 feet per minute. Typically, nozzles used with the present invention should be capable of effusing a cone of turbulent spray, at least 5 inches in diameter having the velocity of 1,000 feet per minute within 10 inches of the atomizing nozzle.

The downwardly directed cloud of turbulent spray emitted from each nozzle 20 achieves several novel effects. Primarily, the turbulent cloud containing atomized molecular sized particles of spray preparation randomly swirls in and about the protruding foliage of the crop. This swirling not only coats the upwardly exposed foliage surfaces but additionally has been found to coat the concealed undersides of the foliage.

The downwardly directed turbulent cloud of atomized spray additionally serves to displace the ambient air about that portion of the crop being sprayed. This displacement of the ambient air results in the crop being enveloped within a turbulent cloud of atomized spray and prevents the ambient air from impeding and interfering with the spray treatment.

A further effect of the downwardly directed turbulent cloud is that a localized downwardly directed wind is created over each plant of the sprayed crop. This wind, in the order of at least 20 miles an hour, randomly displaces and agitates the leaves or foliage of the crop exposing a greater surface of the crop foliage to the spray, thereby enhancing its effectiveness.

The present invention has been found especially suited for spraying row crops. With reference to FIG. 1, crop E is shown planted on a field 42 having furrows 43 spaced at 42 inch intervals. Crop rows 45, here shown as strawberries, are planted on 13 inch centers between the respective furrows. Nozzles 20 are disposed on 8 inch centers and pass overhead of crop E at an elevation of preferably 4—6 inches. The strawberry row crop illustrated in FIGS. 1 and 2 has a relatively low-lying plant protruding upwardly from the planted field a distance of about 8 inches.

It has been found that the present invention is also effective for high-growing crops such as broccoli, protruding 30 to 36 inches above the field. Such crops have been found to disperse the downwardly directed turbulent cloud with their foliage so as to create the desired turbulent penetration of all foliage surfaces.

The present invention has the major advantage of diluting the concentrated spray without diminishing its effectiveness. Conventional spray apparatus has utilized large volumes of diluents such as water to effect the required dispersion of concentrated fungicides and insecticides. For example, conventional spray mixtures have applied 1 quart of Kelthane MF, a product of Rohm and Hass Corporation, diluted in 200—300 gallons of waterer to an acre of strawberries. By utilizing the present invention, spray preparation for strawberries can be limited to dispersing 1 quart of the concentrated spray in 10 gallons of water per acre of strawberries. As can be seen, the present invention reduces the water necessary to dilute the concentrated spray to 4 percent of the previous level used with strawberries. Similar results have been obtained on vegetables. This reduction of the water diluent required is a direct result of the substitution of air for the water diluent within the atomizing nozzles 20.

Visual inspections of crops sprayed in accordance with this invention has demonstrated the inventions utility. The foliage undersides and other obstructed foliage locations have been seen to have received a coating of spray. The crops sprayed in accordance with this invention have responded to the spray treatment in a superior manner and for longer intervals of time despite the fact that the same volume of concentrated fungicides and insecticides have been used.

It will be appreciated that the foregoing invention has been described in some detail by way of illustration and example for purposes of clarity of understanding, it is understood that certain changes and modifications can be practiced within the spirit of the invention.

I claim:

1. A process of spraying crops comprising the steps of: atomizing liquid spray preparation with air; directing said atomized liquids spray preparations substantially downwardly on said crop from a location in space overlying said crop, the velocity of said spray at the topmost foliage of said crop being at least 1,000 feet per minute; imparting turbulence to said downwardly directed atomized liquid spray preparation sufficient to envelope said crop and coat the underside of the foliage of said crop with spray, said turbulence being imparted to said atomized liquid spray by high pressure air, said air being intermixed with said liquid preparation at a pressure of at least 40 pounds per square inch, moving said location at a predetermined rate over said crop to sequentially coat the plants of said crop with spray.

2. The process of spraying corps in accordance with claim 1 wherein the liquid spray is an agricultural chemical spray.

3. A process of spraying crops according to claim 1 and wherein said turbulence is imparted to said spray by atomizing said liquid spray preparation with air at a distance in the range of 2—10 inches above the topmost foliage of said crop.

4. A process of spraying crops according to claim 1 and wherein said directing occurs from a plurality of locations spaced in side-by-side relation normal to the direction of movement of said location.

5. A process of spraying crops according to claim 4 and wherein said locations are separated by 8 inches.